United States Patent
Chu et al.

(10) Patent No.: US 7,701,865 B2
(45) Date of Patent: Apr. 20, 2010

(54) METHOD AND APPARATUS FOR CONFIGURING AN AUTOMATIC CROSS CONNECT SYSTEM AT A REMOTE WIRING HUB

(75) Inventors: Thomas P. Chu, Englishtown, NJ (US); Paul Francis Gagen, Califon, NJ (US); Francis Robert Magee, Lincroft, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1599 days.

(21) Appl. No.: 10/954,962

(22) Filed: Sep. 30, 2004

(65) Prior Publication Data
US 2006/0072472 A1 Apr. 6, 2006

(51) Int. Cl.
*H04J 1/16* (2006.01)
*H04M 7/00* (2006.01)

(52) U.S. Cl. .................. 370/252; 379/221; 379/225; 379/227

(58) Field of Classification Search ............... 370/252; 379/225–333, 221.01
See application file for complete search history.

(56) References Cited

U.S. PATENT DOCUMENTS 6,650,649 B1 * 11/2003 Muhammad et al. ........ 370/402

| | | | |
|---|---|---|---|
| 2001/0015978 A1 * | 8/2001 | Blanset et al. | 370/395 |
| 2002/0101973 A1 | 8/2002 | Teixeira | |
| 2004/0073520 A1 | 4/2004 | Eskandari | |
| 2004/0264511 A1 * | 12/2004 | Futch et al. | 370/535 |

FOREIGN PATENT DOCUMENTS

WO  WO 00/65780 A  11/2000
WO  WO 02/062079 A  8/2002

OTHER PUBLICATIONS

Search Report in corresponding EP 05 25 5907, Dec. 12, 2005, Lucent Technologies, Inc.

* cited by examiner

*Primary Examiner*—Rasha S Al Aubaidi

(57) ABSTRACT

A method and apparatus for configuring connectivity at a hub having a plurality of subscriber lines from a plurality of subscriber premises and a plurality of feeder lines from a central office. The hub provides connectivity between the plurality of subscriber premises and the central office. The method and apparatus include categorizing the plurality of subscriber lines into a plurality of groups based on penetration rates and churn rates of the plurality subscriber lines. Each group of subscriber lines are connected to feeder lines based on the penetration and churn rates for POTS and/or DSL services. Subscriber line groups with high penetration rates and high/low churn rates are coupled directly to feeder lines. Subscriber line groups with low penetration rates and high/low churn rates are terminated at the hub. Subscriber lines with an intermediate penetration rate are candidates for being connected to the feeder lines via an automatic switch.

21 Claims, 10 Drawing Sheets

METHOD AND APPARATUS FOR CONFIGURING AN AUTOMATIC CROSS CONNECT SYSTEM AT A REMOTE WIRING HUB

FIELD OF INVENTION

The present invention relates to providing connectivity for telephony services at a remote hub. More specifically, the invention relates to optimizing size and configuration of cross connections between subscriber lines and feeder lines at a remote hub based on subscriber line usage and turnover characteristics.

BACKGROUND OF INVENTION

Telephony service providers of telephony (e.g., POTS and DSL) services utilize outside plants that provide connectivity from the subscribers of the service to the central offices (CO) of the service provider. The most common media used in the outside plant is copper loops. A copper loop typically transverses from the CO to the subscriber homes via manholes, wiring cabinets, pedestals, and poles before terminating at the network interface device (NID) at the subscribers' premises.

The manholes and cabinets represent major concentration sites for the wiring. Each cabinet or manhole (i.e., remote hub) typically serves about 500 homes. Each home is wired with approximately 3 to 5 pairs of coppers wires, depending on the practices of the service provider. Thus, about 1500 to 2500 subscriber-lines may terminate at such a remote hub. However, it is unlikely that all the subscriber lines are active. Accordingly, for cost and practical reasons, fewer amounts of wires (i.e., feeder lines) are laid between the remote hub and the central office.

A conventional remote hub includes two frames, one of which terminates a plurality of subscriber lines from the homes (subscriber premises), and the other frame terminates a plurality of feeder lines from a central office. Wiring connections between the two frames are made to provide end-to-end connectivity from the subscribers to the central office, and thereby provide conventional telephone services. In the current practice, such wire connections is performed manually by dispatching field personnel to the hub.

In addition to conventional telephone service, the service providers are currently implementing digital subscriber line (DSL) access as a means to provide broadband access (e.g., video and data) to the subscribers. In order to achieve a maximum rate, DSL service providers increasing deploy digital subscriber line access modems (DSLAMs) at the remote hubs, thereby decreasing the distance of the copper loop to the subscriber premises and increasing the speed of the DSL services. However, the broadband access market is very competitive with many service providers vying for the same market with a variety of the technologies (e.g., DSL, cable, fiber, etc.). This competitive market has resulted in a high subscriber churn (i.e., turnover) rate for such broadband services. Every "churn" of the DSL service typically entails the dispatch of a field technician to re-wire the connections at the remote hub. Dispatches are both costly and time consuming, and service provider would like to reduce these dispatches as much as possible. One method is to deploy an automatic cross-connect (AXC) system that switches analog signals at these hubs. Such AXCs can be controlled remotely by a technician at the network operations center.

In switching the analog signal, the connection through the cross-connect must be able to carry a fair amount of current (e.g., 250-300 milliamps). Further, the connectivity configuration must be maintained at the remote hub in the event of a power failure, thereby ensuring emergency service calls (e.g., 911 calls).

One prior art technique in building analog cross-connects that satisfy the above two requirements is to use electromechanical relay system, such as micro-electro-mechanical systems (MEMS). The current MEMS technology allows implementation of approximately fifty (50) double-posts single throw relays in an 80 pin chip. Each MEMS chip has a size of approximately ¾"×¾", Such that a conventional 11"×18" board of an automatic cross-connect switch (AXC) can accommodate approximately 150 of these chips, plus control and inter-connecting circuitry.

Even with the MEMS technology, cost and space is still major a consideration in the deployment of AXCs at remote hubs. Service providers still face the problem of whether to deploy a larger system, which provides more coverage but at higher costs, or a smaller systems that would be less costly but provide less coverage. Given these considerations, it is highly desirable to reduce the number of cross-points, and hence the number of MEMS cross-connect chips of the AXC, which would reduce both the cost and space requirement of the AXC.

Ultimately, deployment of the AXC at the remote hubs depends on the relative cost of equipment, the relative operation cost of dispatching a field technician to the remote hub, the frequency of dispatches, among other considerations. Presently, there are no satisfactory tools or techniques available to decompose (reduce and optimize) a switch based on application and service specific characteristics. That is, there is no satisfactory method and apparatus to generate recommendations for the number of and optimal size of the AXC switches that should be deployed at a specific hub, as well as how the AXC is to be connected, based the characteristics of the lines for the POTS and DSL services.

SUMMARY OF THE INVENTION

Accordingly, we have recognized that there is a need for a method an apparatus that assists in optimizing connectivity between subscriber lines and feeder lines at a remote hub, since the hubs have limited space and high costs associated with providing connectivity at the hubs may be considerable. In one embodiment, a plurality of subscriber lines coupled to a plurality of subscriber premises are characterized by their penetration rates and churn rates. The present invention forms the subscriber lines into groups with similar characteristics, and specifies how the lines of a particular group should be connected (i.e., configured) to the feeder lines at the hub.

Each group of subscriber lines is evaluated independently. Based on policy considerations of the service provider, in one embodiment, a group of subscriber lines having a high penetration rate and a high/low churn rate are coupled directly to the feeder lines. Alternatively, a group of subscriber lines having a low penetration rate and either a high or low churn rate are terminated at the hub. Similarly, a group having a medium penetration rate and a low churn rate are also terminated at the hub. Such terminated subscriber lines may be connected to feeder lines at a later time by dispatch, on an as needed basis.

In one embodiment, a group of subscriber lines having a medium penetration rate and a high churn rate is considered a candidate for providing connectivity via an automatic cross-connect (AXC) switch. If an AXC switch is deemed a preferred technique to provide connectivity to the feeder lines for a particular group, the present invention determines the optimal sizes of the various AXCs at a remote hub based on a desired coverage rate. The coverage rate indicates a percentage of subscriber lines to be connected to the feeder lines by dispatch, while the size of the switch dictates the number of feeder lines required for the group of subscriber lines.

In one embodiment, the present invention is implemented as a hub configuration software tool illustratively located at a central office. The hub configuration software tool may be used by service providers to configure the cross-connect points between the subscriber lines and feeder lines on a hub-by-hub basis. The present invention is applicable for hubs providing POTS service, DSL service (with or without line-sharing), and an integrated POTS/DSL solution. Accordingly, the present invention helps alleviate space constraints at the hubs by reducing the cross-connect points and sizes of the switches. Further, dispatch costs associated with providing service connectivity at the hub are reduced by connecting the subscriber lines to the feeder lines based on penetration and churn rates of the subscriber lines.

BRIEF DESCRIPTION OF THE DRAWINGS

The teachings of the present invention can be readily understood by considering the following detailed description in conjunction with the accompanying drawings, in which.

Figure 1:
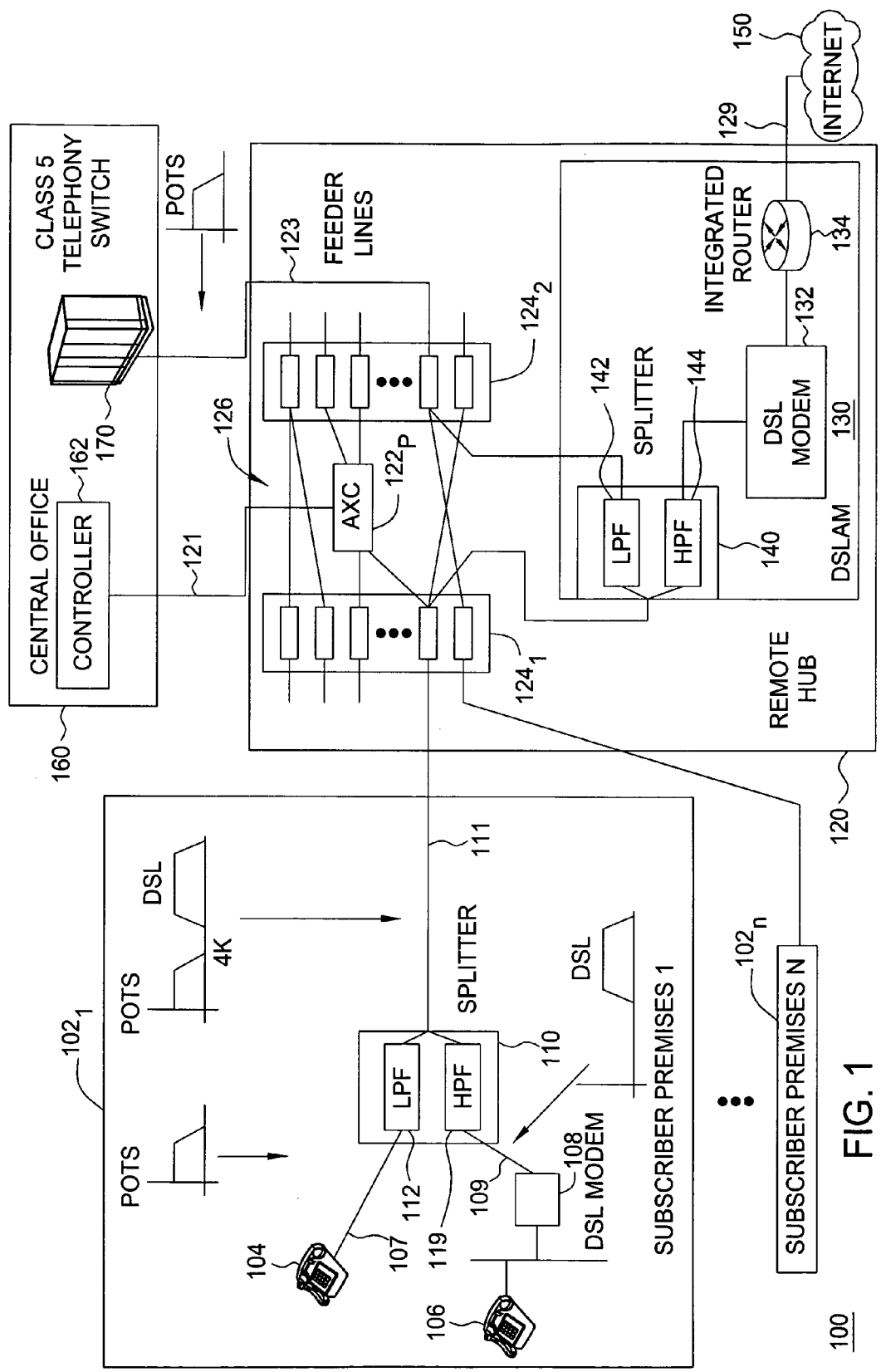
FIG. 1 is a block diagram of an exemplary telephony network environment suitable for supporting the present invention.

To facilitate understanding of the invention, identical reference numerals have been used, where possible, to designate identical elements that are common to the figures. Further, unless specified otherwise, any alphabetic letter subscript associated with a reference number represents an integer greater than one.

DETAILED DESCRIPTION OF THE INVENTION

The present invention provides a method and apparatus to configure connectivity at a remote hub, based on application and service specific characteristics. In one embodiment, the present invention may be implemented as a software tool that is installed on a processor system at a central office of a service provider. The present invention is capable of characterizing subscriber lines by their penetration rates and turnover (churn) rates to the subscriber premises and then group the subscriber lines accordingly. The present invention then determines how the subscriber lines of each group should be optimally connected to the feeder lines, which route to the central office. Specifically, the subscriber lines of a selected group may be routed directly to the feeder lines, coupled to the feeder lines via an automatic cross-connect (AXC) switch, or terminated at the hub, based on predetermined policies associated with the penetration rates and churn rates of the subscriber lines.

In addition, where it is optimal to deploy an AXC switch for a group of subscriber lines at the hub, the present invention provides an optimal size for such AXC switch, as well as how the AXC is to be connected, based the line characteristics for plain old telephony system (POTS) and digital subscriber line (DSL) services. The recommendations generated by the present invention are hub specific, and more than one (or none) AXC can be deployed at the hub. By analyzing the subscriber lines based on penetration and churn rates to the subscriber premises, fewer cross-points are required at a hub than the original system, thereby leading to lower costs (e.g., dispatch costs), as well as less consumption of space (real estate) necessary to implement a switch at a remote hub.

Further, the present invention is independent of the AXC switch technology (robotics, MEMS, among others) and how the AXC is implemented, such as using a full-matrix, a 3-stage Clos (e.g., strictly non-blocking (SNB), rearrangeable (AR), or wide-sense non-blocking (WSNB) configurations), among other switch configurations. The present invention is applicable to POTS service, DSL services (with or without line-sharing), and a combination (i.e., integrated services) thereof.

FIG. 1 depicts a block diagram of an exemplary telephony network environment 100 suitable for supporting the present invention. The network 100 is illustratively shown as a telephony Service Provider (SP) network for providing plain old telephone system (POTS) and digital subscriber line (DSL) services for clients (customers). The network 100 comprises a plurality of subscriber premises $102_1$ through $102_n$ (collectively subscriber premises 102) that are selectively coupled to a telephone switch 170 and/or a packet switched network 150 (e.g., the Internet), via a remote hub 120.

In particular, each subscriber premises 102 includes conventional analog and digital equipment (e.g., telephone, computer device, and the like) to subscribe to POTS and/or DSL services. Each subscriber premise 120 is coupled to the remote hub 120 via one or more subscriber lines 111, as discussed below in further detail. For example, a subscriber receiving POTS services illustratively has one or more telephones 104 coupled via telephone line 107 to a subscriber line 111 (i.e., "copper loop"), which is coupled to the remote hub 120 of the service provider. It is noted that each subscriber line at a subscriber premise 102, if activated, is associated with a unique telephone number.

Human speech only requires a small amount of bandwidth. Most telephony networks allocate 4 KHz of bandwidth to support a voice channel. However, the copper loop can support much more bandwidth than 4 KHz. By utilizing this extra bandwidth, the copper loop can be used to carry high-speed data through the use of a modulator and demodulator (modem). The modems that are used on subscriber copper loops are referred to digital subscriber line (DSL) modems.

Subscribers of DSL services may utilize a computer device 106 (e.g., a laptop, desktop, or other computer device capable of processing digital information) coupled to a DSL modem 108 via DSL line 109. The DSL modem 108 provides connectivity to the subscriber line 111 by modulating packetized information into an analog signal for transfer over the subscriber line 111. There are many versions of DSL modems representing the continuing advances of this technology. The most prevalent DSL modem currently is ADSL (Asymmetrical DSL), which operates from 26 KHz to 1.1 MHz. In ADSL, the data speed of the downstream direction differs from the upstream direction, as most consumers would receive more data than transmitting when accessing the Internet. The next generation of ADSL is commonly referred to as VDSL (Very high speed DSL). VDSL operates from 138 KHz to 12 MHz. It has maximum data rates of 51.84 Mbps and 2.3 Mps, for downstream and upstream traffic respectively.

Both ADSL and VDSL are designed so that plain old telephony service (POTS) can share the same line with them through frequency division multiplexing. For purposes of describing and implementing the present invention, DSL services are provided on only a single subscriber line 111. That is, only one DSL modem 108 is provided per subscriber premise 102.

For subscribers receiving both POTS and DSL services, a splitter 110 having one low-pass filter (LPF) 112 and one high-pass filter (HPF) 114 is installed at the subscriber's premise 102. As shown in FIG. 1, voice traffic from the phone is coupled to the LPF 112 via telephone line 107, while data traffic from the DSL modem 108 is coupled to the HPF 114 via DSL line 109. Thus, the presence of the splitter 110 accommodates both types of services (POTS and DSL) over a single subscriber line 111.

A remote hub 120 is installed in a neighborhood at a suitable location (e.g., manhole, pole, cabinet, among other locations) for providing service connectivity to a plurality of subscriber premises 102. Each hub 120 comprises at least one cross-connect switch 122, and may optionally include a digital subscriber line access multiplexer (DSLAM) 130 if DSL services are provided, as shown in FIG. 1. The AXC switch 122 is capable of facilitating transfer of analog signals between subscriber premises 120 for both POTS and DSL services.

Specifically, the remote hub 120 comprises two termination frames $124_1$ and $124_2$ (collectively termination frames 124) for terminating the subscriber lines 111 from the subscriber premises 102, as well as the feeder lines 123 from the central office 160. Typically, the termination frames 124 are capable of terminating and cross-connecting thousands of subscriber lines and feeder lines.

Appropriate wiring connection lines (i.e., cross-connect points) 126 are made between the two frames 124 to provide end-to-end connectivity from the subscriber premises 102 to a central office 160. At least a portion of the cross-connect points 126 may be provided through one or more switches, such as an automatic cross-connect (AXC) switch $122_p$, where p is an integer greater than zero. Although only a single subscriber line is shown between the subscriber premise 1 $120_1$ and the first termination frame $124_1$, a person skilled in the art will recognize that this single subscriber line 111 represents a line pair. Further, although only one subscriber line pair 111 is shown between the subscriber premise 1 $120_1$ and the AXC switch 122, a person skilled in the art will recognize that a single AXC switch 122 may be coupled to, for example, hundreds of subscriber lines (pairs) 111. In fact, since there are typically 3-5 subscriber line pairs to each subscriber premise (household) 102, a single hub may terminate 1500 to 2500 subscriber lines 111.

Similarly, although only a single feeder line 123 is shown between the second termination frame $124_2$ and the central office 160, a person skilled in the art will recognize that this single feeder line 123 also represents a line pair. Further, although only one feeder line pair 123 is shown between a single AXC switch 122 and the central office 160, a person skilled in the art will recognize that a single AXC switch 122 may be coupled to, for example, hundreds of feeder lines (pairs) 123 that are subsequently routed to the central office 160.

When implementing the line-sharing option (i.e., the hub also facilitates DSL services), the DSLAM 130 at the remote hub 120 is connected as an access point 126 between the subscriber line side 111 and the feeder line side 123 of the AXC 122. In one embodiment as shown in FIG. 1, the DSLAM 130 comprises a splitter 140, a DSL modem 132, and an optional router 134. The splitter 140 includes a LPF filter 142 that passes low frequency voice (POTS) signals to the telephony switch 170 for routing to other subscriber premises 102.

Specifically, the LHF 142 ensures that the spectrum between phone 104 and the splitter 140 operates only from 0 to 4 KHz. The splitter 140 also includes a HPF filter 144 that ensures that the spectrum between subscriber's DSL modem 108 and the splitter 140 at the hub 120 operates at the high frequency band. The HPF 140 passes the high frequency DSL signals to the DSL modem 132, where the received DSL analog signals are demodulated into a packetized format (e.g., IP packets) and forwarded to the router 134 for routing. The router 134 forwards the packetized information to a particular destination node, over a high speed data line 129 associated with a packet switched network, such as the Internet 150, an intranet, or combination thereof.

Although the splitter 140 is illustratively shown as being implemented in the DSLAM 130, one skilled in the art will appreciate that the splitter 140 may be installed elsewhere in the hub 120 as a separate filtering unit, illustratively positioned proximate the DSLAM 130

The AXC switch 122 may be implemented in various forms at the remote hub 120. For example, given a cross-connect switch 122 with M input ports and N output ports, the simplest implementation is a full matrix consisting of a rectangular array of M×N cross-points. For a cross-connect with N inputs and N outputs, there is $N^2$ cross-points. This architecture is not efficient where large amounts of subscriber lines and feeder lines are being connected at the switch. The architecture is also not scaleable as the number of cross-points grows quadratically with respect to the N inputs and outputs. However, because of its simplistic configuration, it is usually used as a benchmark in comparing different switch sizes and architectures.

Alternatively, a Clos switching architecture for a non-blocking switch requires much less cross-points. The Clos switch consists of a number of stages, the simplest one having three stages, as conventionally known in the art. Using an exemplary 3-stage Clos network as the basic building blocks, a multi-stage architecture can be developed. As the number of stages increases, more reduction can be achieved for large N. However, with each additional stage there is an added cost of wiring between stages, as well as the need of a complex control algorithm to route through the successful stages of the switch. Also, each stage adds attenuation to the signal, which places practical limits on the number of stages feasible. The Clos network is not the only switching architecture. Other switching architectures are possible, each having distinct characteristics.

Further, there are three types of non-blocking switches. A first type is a strictly non-blocking (SNB) switch. For SNB switches, the user can always establish a new connection regardless of the current state of the switch, and without disturbing the current connections. A second type of switch is a rearrangeable (AR) switch. For AR switches, the user can always establish a new connection. However, the user may have to rearrange some of the current connections to accommodate the new request. A third type of switch is a wide sense non-blocking (WSNB) switch. Associated with each WSNB is also a routing algorithm, which is used in establishing connections through the switch. For WSNB switches, the user can always establish a new connection without disturbing the current connections, as long as all the previous connections are routed by using the designated algorithm. These non-blocking type switches, when implemented in a 3-stage Clos switch, require less cross-points than the full matrix switch in instances where the number of input (or output) ports is greater than 36.

The AXC switch 122 may be formed by robotics, relays, and in a preferred embodiment, micro-electro-mechanical systems (MEMS), as conventionally known in the art. In any embodiment, the AXC 122 has to support a current level of 250 to 300 milliamps, which places a minimal size on the wiring and the miniaturized relay of the MEMS chips. However, the present invention is independent of the technology and on how the AXC module is implemented (full-matrix, 3-stage Clos SNB, 3-stage Clos AR, other). For a detailed description of one technique used to further reduce the number of cross-points in an AXC switch, the reader is directed to commonly assigned patent application Ser. No. 10/954,965, filed Sep. 30, 2004, the contents of which are hereby incorporated by reference in their entirety.

The central office (CO) 160 of the service provider includes a controller 162 and a telephony switch 170. The telephony switch routes voice signals associated with the POTS services between subscriber premises 102 in a conventionally known manner.

In particular, the controller 162 is connected to the AXC switch 122 at the remote hub 120. In one embodiment, one of the feeder lines 123 can be used to provide connectivity to the hub 130. Alternatively, the integrated router at the DSLAM may be used. The controller 162 performs two major functions. A first function is to allow support persons at the CO 160 to cross-connect subscriber lines connected to the AXC switch 122 to feeder lines connected to the same AXC. Through this capability, dispatches to the remote hub to manually cross-connect the lines become unnecessary.

A second function that the controller 162 performs is to recommend to the service provider the optimal configuration for one or more AXC switches 122 at a particular hub, including the size of the AXC, and the particular set of subscriber lines and feeder lines that should be connected to the AXC switch 122. The recommendation is based on a number of factors such as the subscription rate and the churn rate of a service at that hub, the cost of a dispatch, among other considerations.

For example, a hub that is located far away from the dispatch office typically has high dispatch costs. Accordingly, the deployment of an AXC 122 at a hub 130 is more attractive. This second function is an off-line function that does not require connectivity to the AXC, and is the focus of the present invention. Although a single controller 162 is illustratively shown providing these first and second functions, these functional aspects may be implemented by two or more separate controllers. However, for simplicity, an integrated version is shown and discussed and the term "controller" is use to represent both functions.

In one embodiment, the controller 162 includes a database (not shown) for storing connectivity information with respect to each hub 120. Such connectivity information may include, for example, location of each hub 120, number of subscriber premises 102 associated with each switch, number of subscriber lines 111 per subscriber premise, number of feeder lines 123 per switch, types of service (POTS and/or DSL) associated with each subscriber premise, types of service associated with each subscriber line, subscriber and feeder line termination information, cross-point connectivity 126, number of switches 122 per hub, types of switches, among other telephony connectivity and inventory information.

Figure 2:
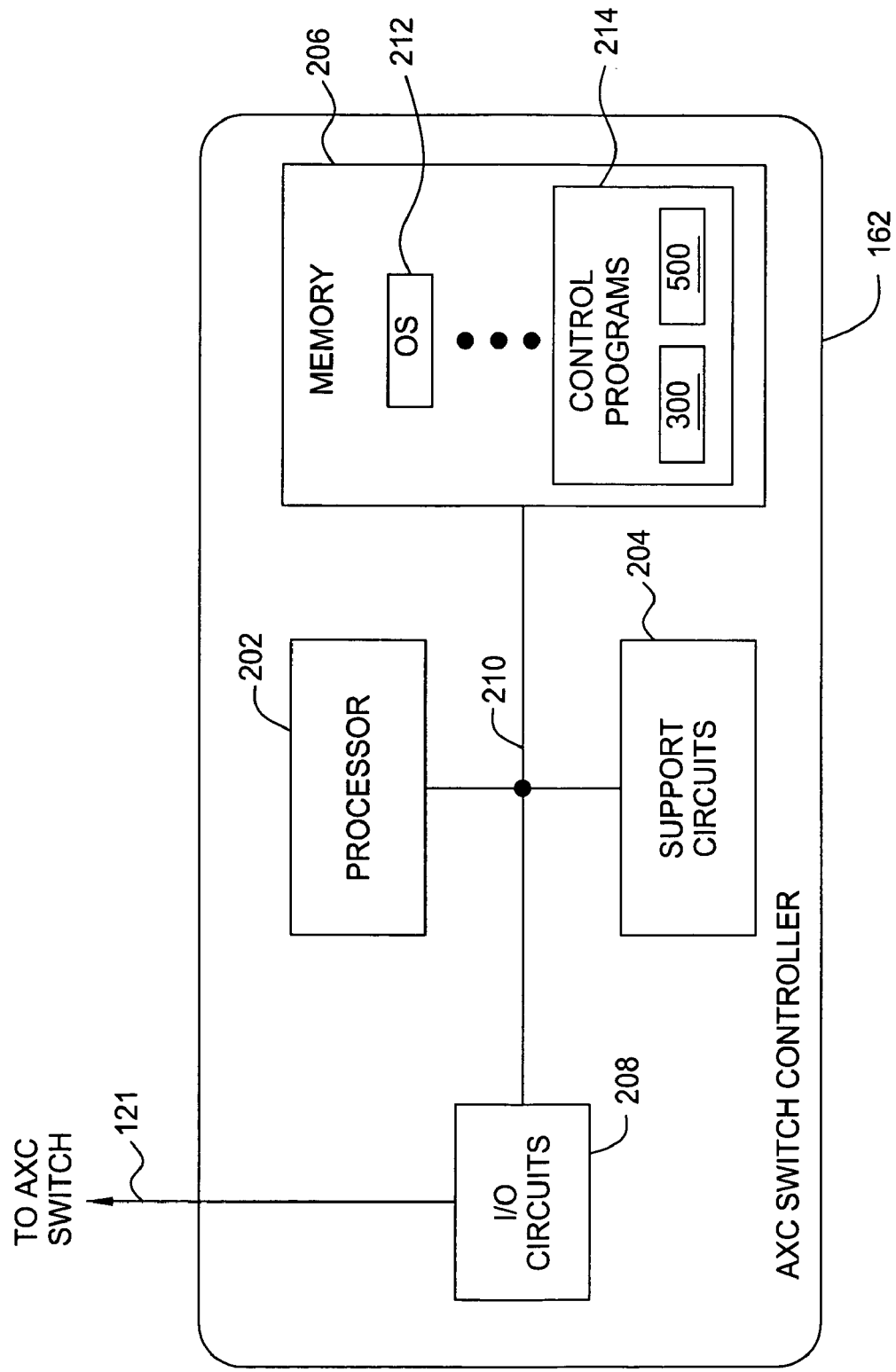
FIG. 2 is a high-level block diagram of an exemplary controller suitable for managing an AXC switch.

FIG. 2 depicts a high-level block diagram of an exemplary controller 162 suitable for managing an AXC switch 122. Specifically, the controller 162 of FIG. 2 comprises a processor 202 as well as memory 206 optionally having an operating system 212, as well as for storing various control programs 214 (e.g., method 300 of FIG. 3 and method 500 of FIGS. 5A and 5B). The processor 202 cooperates with conventional support circuitry 204, such as power supplies, clock circuits, cache memory and the like, as well as circuits that assist in executing the software routines (e.g., control programs 214) stored in the memory 206. As such, it is contemplated that some of the process steps discussed herein as software processes may be implemented within hardware, for example, as circuitry that cooperates with the processor 202 to perform various steps.

The controller 162 also contains input/output (I/O) circuitry 208 that forms an interface between the various functional elements communicating with the controller 162. For example, in the embodiment of FIG. 1, the controller 162 may include a display device and input devices (e.g., keyboard, mouse, and the like) that enable an administrator to monitor and configure a selected hub 120 (including any deployed AXC switches 122), illustratively via a control line 121.

Although the controller 162 of FIG. 2 is depicted as a general-purpose computer that is programmed to perform various control functions in accordance with the present invention, the invention can be implemented in hardware such as, for example, an application specific integrated circuit (ASIC). As such, it is intended that the processes described herein be broadly interpreted as being equivalently performed by software, hardware, or a combination thereof.

Figure 3:
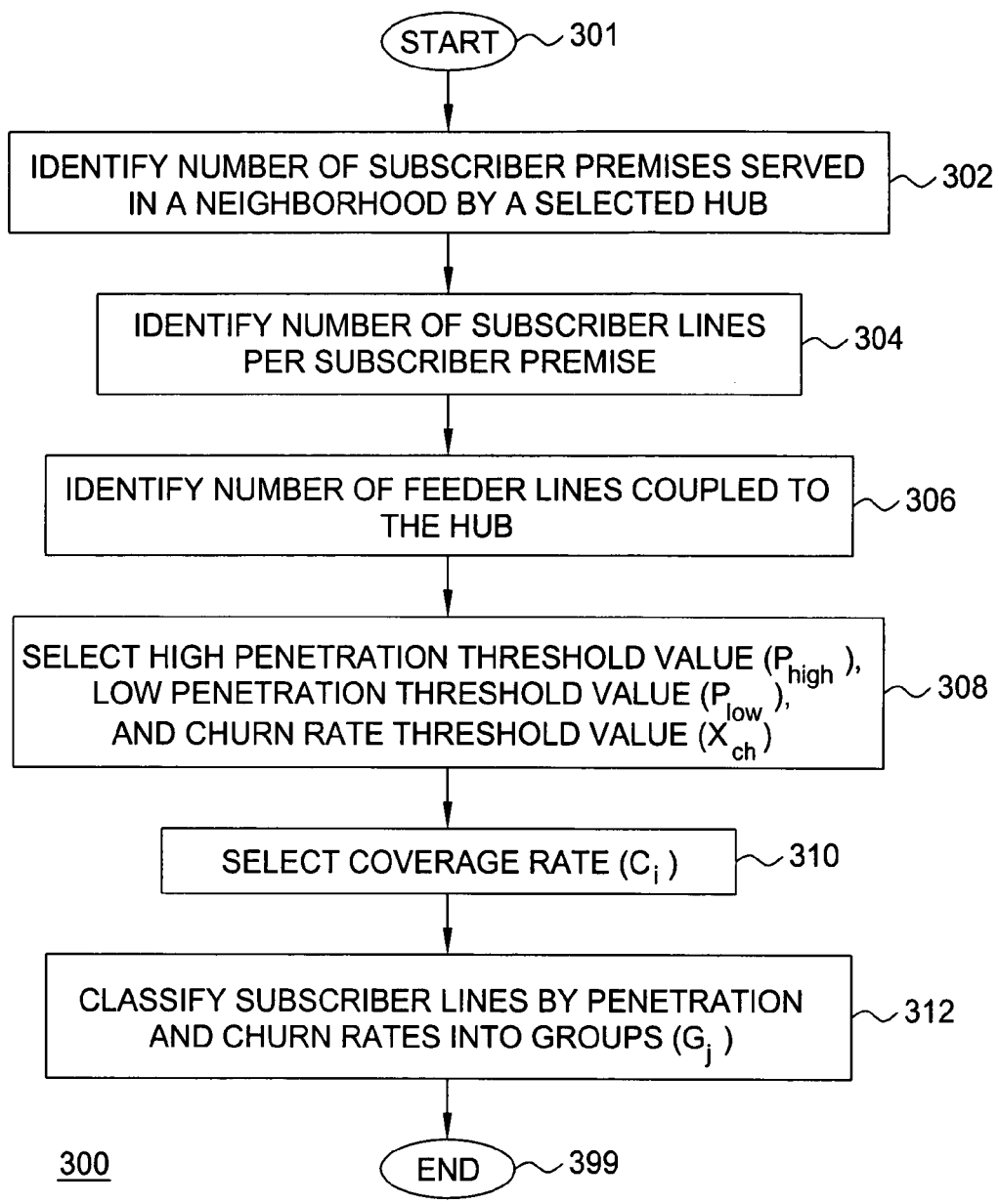
FIG. 3 is a flowchart of a method for determining an existing line connectivity arrangement at a hub.

FIG. 3 is a flowchart of a method 300 for determining an existing line connectivity arrangement at a hub. The method 300 is an initialization process that is performed at the central office 160 in order to determine the current wire connection arrangements (e.g., terminations and cross-points 126 at a particular (i.e., selected) hub 120, as well as to classify groups of subscriber lines by their penetration rate and churn rate.

Method 300 is used as a baseline for optimizing connectivity at the hub, which is discussed below in further detail with respect to method 500 of FIGS. 5A and 5B. Optimizing the configuration of connectivity between the subscriber lines 111 and feeder lines 123 helps reduce the cross-connects 126, illustratively by reducing number of feeder lines and/or the size of the switch used for a particular group of subscriber lines. Reducing the size of the switch also saves space at the hub 120. This determination is based of the penetration rate and churn rate of the particular services offered for the different subscriber line groups. Additionally, by being able to connect subscriber lines to feeder lines remotely from the central office 160, the number of field dispatches will be significantly reduced, thereby further reducing costs associated with providing subscriber services.

The method 300 starts at step 301, where an administrator at the central office 160 accesses the controller 162 (e.g., a computer terminal, laptop, desktop, server, or other processing device capable of interfacing with one or more hubs 120), and selects a particular hub 120 associated with a neighborhood that is to be optimized. More specifically, the administrator selects a particular hub 120 that supports a plurality of subscriber premises (e.g., homes). At 302, the controller 162 determines (identifies) the quantity of subscriber premises 102 in the neighborhood supported (served) by the selected hub 120. For example, the hub 120 may support thousands of subscriber premises 102.

At step 304, the controller 162 determines (identifies) the quantity of subscriber lines 111 per subscriber premise 102. In the U.S., the number of subscriber lines 111 entering a subscriber premise 102 is between 3 and 5 lines. For purposes of illustration and discussion henceforth, it is assumed that each subscriber premise 102 has four (4) subscriber lines 111 (i.e., 8 actual lines since each subscriber line represents a line pair).

At step 306, the controller 162 determines (identifies) the quantity of feeder lines 123 disposed between the hub 120 and the central office 160. The number of feeder lines may be equal to, less than, or greater than the number of subscriber lines 111 connected to the hub 120. However, as a practical matter to conserve resources and costs, the number of feeder lines 123 is usually less than the number of subscriber lines 111 at the hub 120. For example, approximately 1200 feeder lines 123 are usually adequate to support approximately 2000 subscriber lines 111 per hub 120.

For an exemplary profile having 500 subscriber premises and 4 subscriber lines per subscriber premise, in one exemplary embodiment, a direct solution for providing connectivity is to deploy an AXC 122 of size 2000×1200, where 2000× 1200 represents the number of subscriber lines and feeder lines respectively. It is noted that a full matrix implementation of the switch requires 2.4 M cross-points, while a 3-stage rearrangeable Clos implementation of the above 2000×1200 switch results in approximately 217K cross-points. To implement the 217K cross-points using current technology, MEMS technology supports approximately 50 cross-points per MEMS chip, and each board holds approximately 150 chips. This results in 7.5K cross-points per board. Therefore, approximately 29 boards (217K/7.5K) to implement a 2000× 1200 switch having 217K cross-points. Such a high quantity of cross-connect boards exceeds the size/space constraints for a conventional remote hub 120.

Figure 5A:
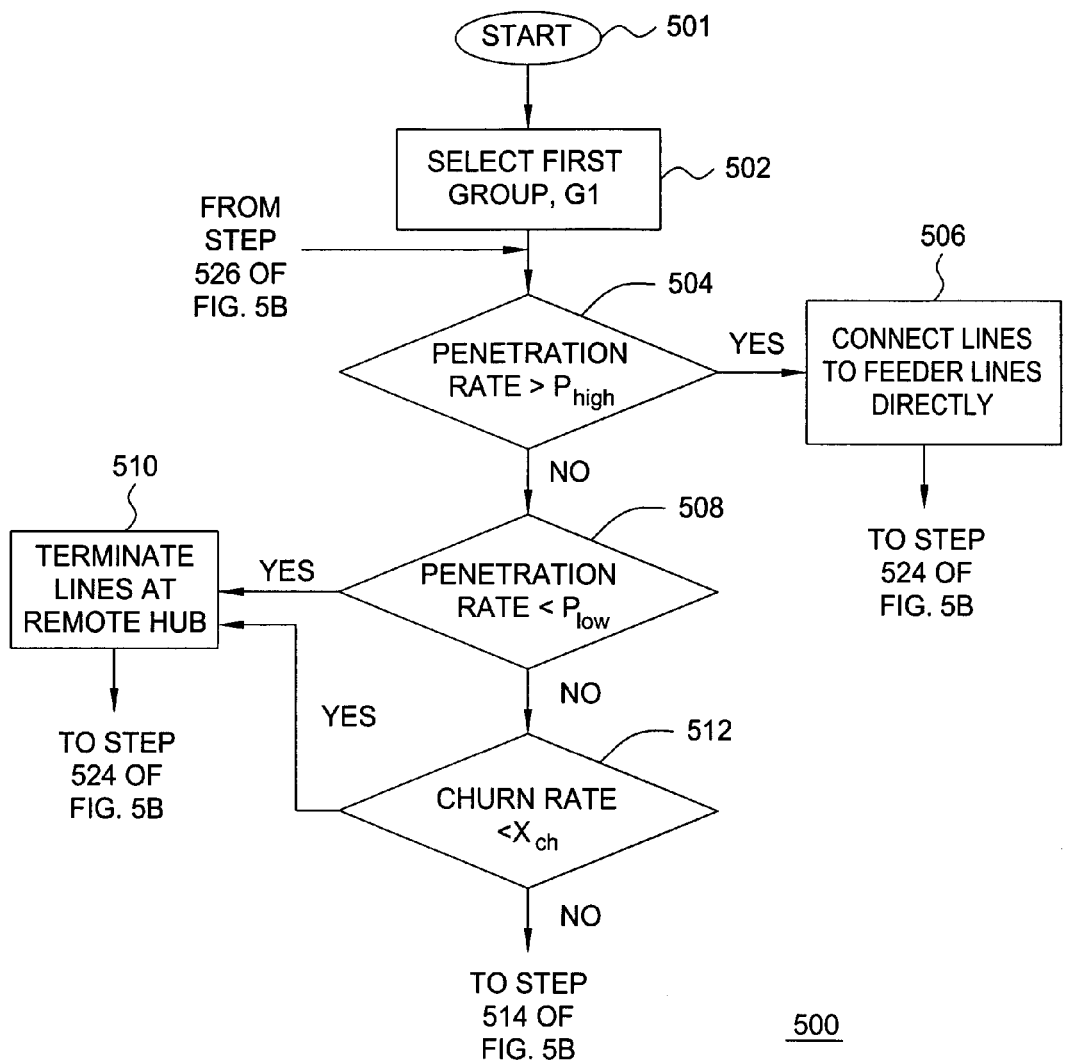
FIGS. 5A and 5B collectively depict a flowchart of a method for determining an optimal line connectivity arrangement at a hub.
Figure 5B:
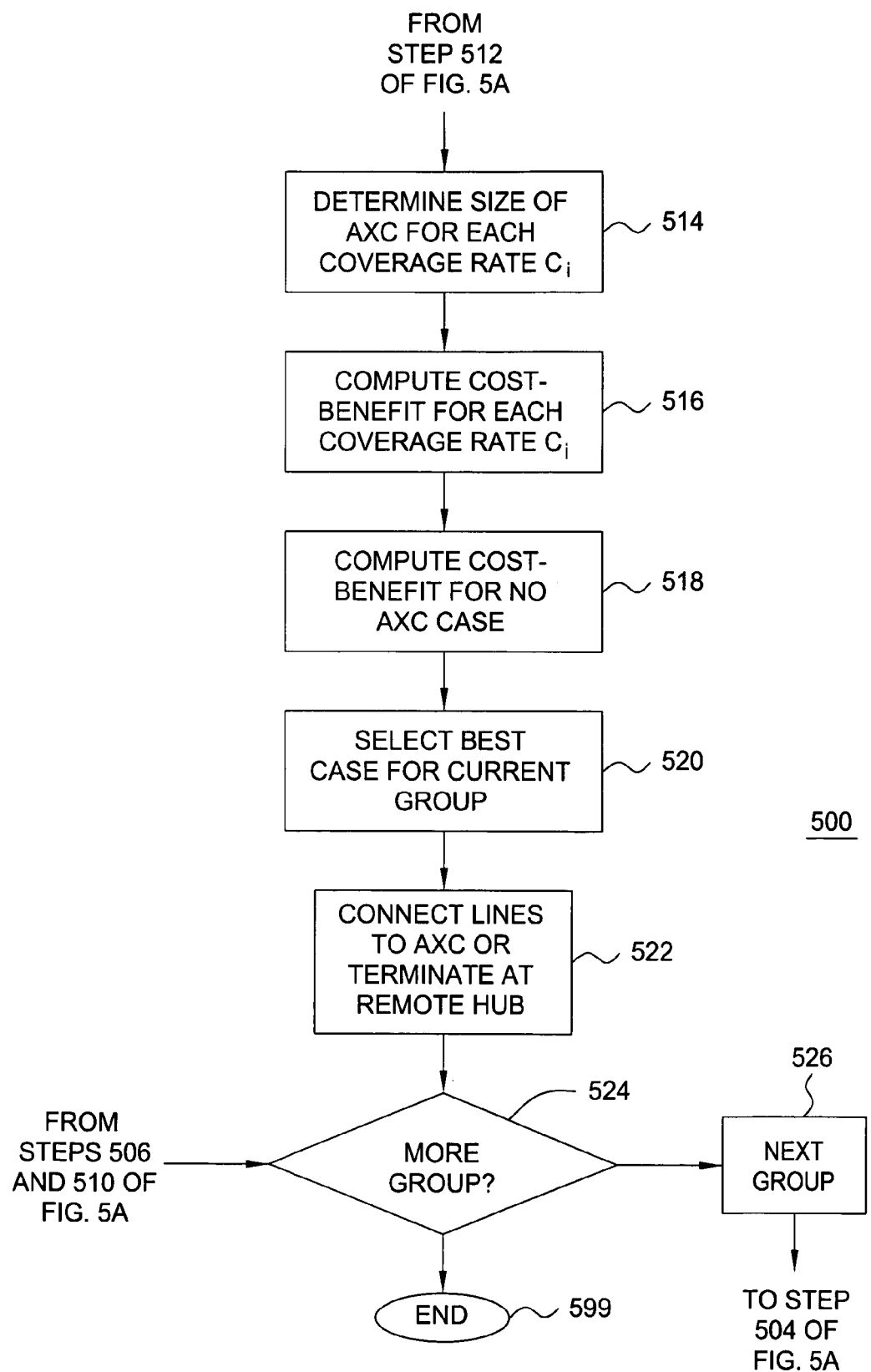

Further reduction of the number of cross-points per board, and accordingly the number of boards per switch, may be realized by implementing the remainder of the initialization process (steps 309-312) and method 500 described with respect to FIGS. 5A and 5B. The present invention is first described by illustration for the case where the service provider only provides POTS services, and at least one AXC switch 122 is deployed to eliminate service provisioning dispatches for the POTS service. Thereafter, the present invention is described for the case where DSL services are also provided by the service provider.

Referring to FIG. 3, once the number of subscriber lines 111 and feeder lines 123 for a selected switch 122 are identified, the method 300 proceeds to step 308. At step 308, a high penetration rate threshold value ($P_{high}$), a low penetration rate threshold value ($P_{low}$), and a churn rate threshold value ($X_{ch}$) associated with the subscriber lines are each selected. A "penetration rate" defines a percentage of subscriber lines that actually facilitate a particular service, such as POTS or DSL services. For example, although each subscriber premise illustratively has four subscriber lines, only one or two of them may actually be used to provide the subscriber with POTS services. A "churn rate" defines a turnover percentage of such services. For example, a household having three POTS phone lines (i.e., three telephone lines) may drop or add a line because a teenage child has respectively left for college or has returned home for a year after graduating college. The penetration and churn rates are usually based on yearly period.

At step 310, the administrator selects a coverage rate ($C_i$). The coverage rate defines the percentage of churn that can be handled by the AXC without having to send a dispatch crew to provide connectivity in the field. In other words, it may be said that a dispatch rate ($D_i$) equals 100% less the coverage rate ($D_i=1-C_i$). A coverage rate of 100% implies no dispatches are required, such as where the switch is configured in a full matrix. A coverage rate less than 100% means that some field technicians will eventually be sent (dispatched) to the hub 120 to reconfigure the switch for added/dropped services.

At step 312, the subscriber lines 111 are classified by the penetration and churn rates and formed into groups ($G_j$). In particular, for an exemplary subscriber household having four subscriber lines, the first line that a subscriber subscribes to is referred to as the first line, a second line that a subscriber subscribes to is referred to as the second line, and so forth. The functionality that is required to support the POTS service is concentration. There are 2000 subscriber lines and only 1200 feeder lines. Therefore, only active subscriber lines should be connected to feeder lines.

The four subscriber lines per household 102 have different characteristics. As most households usually subscribe to one POTS line, the first line has a very high penetration rate but very low churn rate. For example, the first line usually gets disconnected when a subscriber moves, but the next tenant will subscribe to the service when they move in. On the other hand, the fourth line usually has a very low penetration rate but a high churn rate.

By illustration, the characteristics of the lines of a service provider may be identified as shown below in TABLE 1. It is noted that the values presented in TABLE 1 are for illustrative purposes only.

TABLE 1

| Line number | Penetration Rate | Churn rate |
|---|---|---|
| $1^{st}$ line | 95% | 1% |
| $2^{nd}$ line | 60% | 10% |
| $3^{rd}$ line | 25% | 25% |
| $4^{th}$ line | 10% | 30% |

Figure 4:
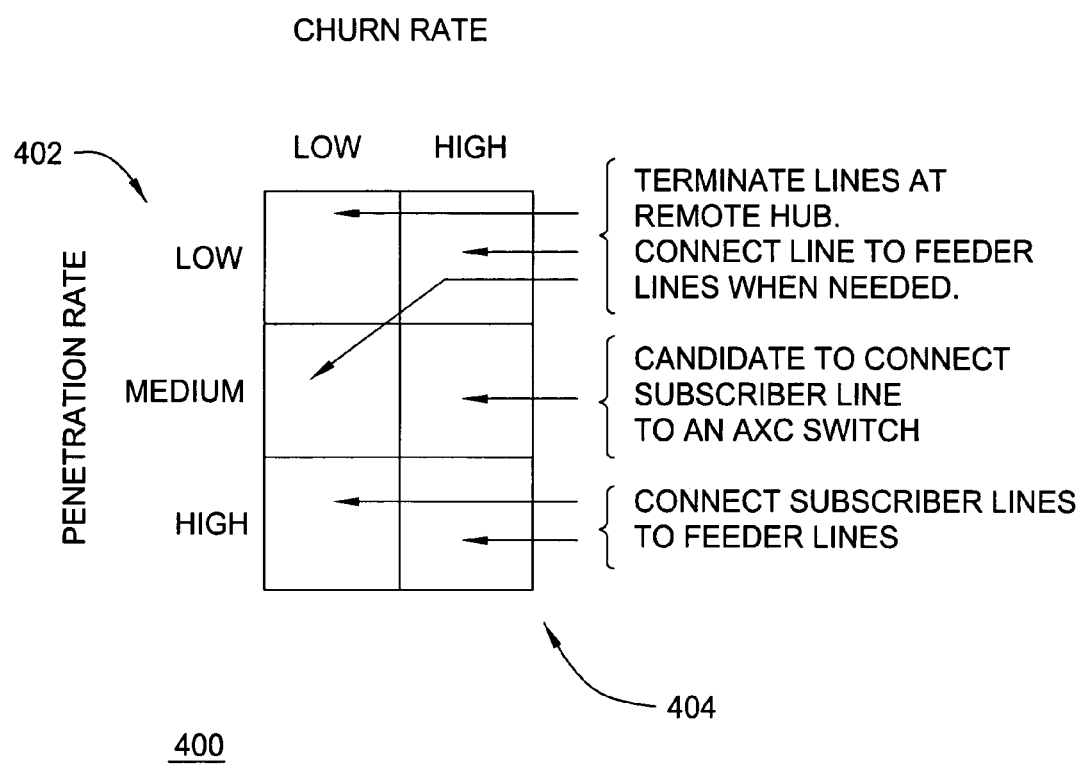
FIG. 4 is a graphical representation of a wiring policy at a remote hub.

FIG. 4 is a graphical representation 400 of a wiring policy at a remote hub 120. The graph 400 comprises an ordinate 402 representing penetration rates (high, medium, and low) and an abscissa 404 representing the churn rate (low and high). The policy for the treatment of a particular line depends on its characteristics. Specifically, for lines that have a high penetration rate, regardless of its churn rate, the subscriber line is directly connected to a feeder line. This policy would be applicable to subscriber line 1 in the above example.

For lines that have low penetration rate, regardless of its churn rate, the policy is to terminate the subscriber line at the remote hub 120 until it is needed. At that time, a dispatch is sent to connect the subscriber line to a feeder line. The fourth line in the above example fits these characteristics. In the example above, there are 500 fourth lines. On the average, about 50 (10%) of them are active. These 50 lines would result in about fifteen (50×30%) dispatches per year. This policy provides that it is not economical to eliminate these 15 dispatches by the use of an AXC 122.

Lines that have an average penetration rate and average to high churn rate are candidates to be connected to an AXC switch 122. The final decision is based on economic factors such as the cost of a dispatch, AXC equipment cost, revenue generated because of fast provisioning, among other factors. The second and third lines in the example fit this category.

Lines that have average to low penetration rate, as well as a low churn rate are treated as the fourth lines. That is, the subscriber lines are terminated at the remote hub 120. When needed, a dispatch is sent to the remote hub to connect the subscriber line to a feeder line.

Figure 6:
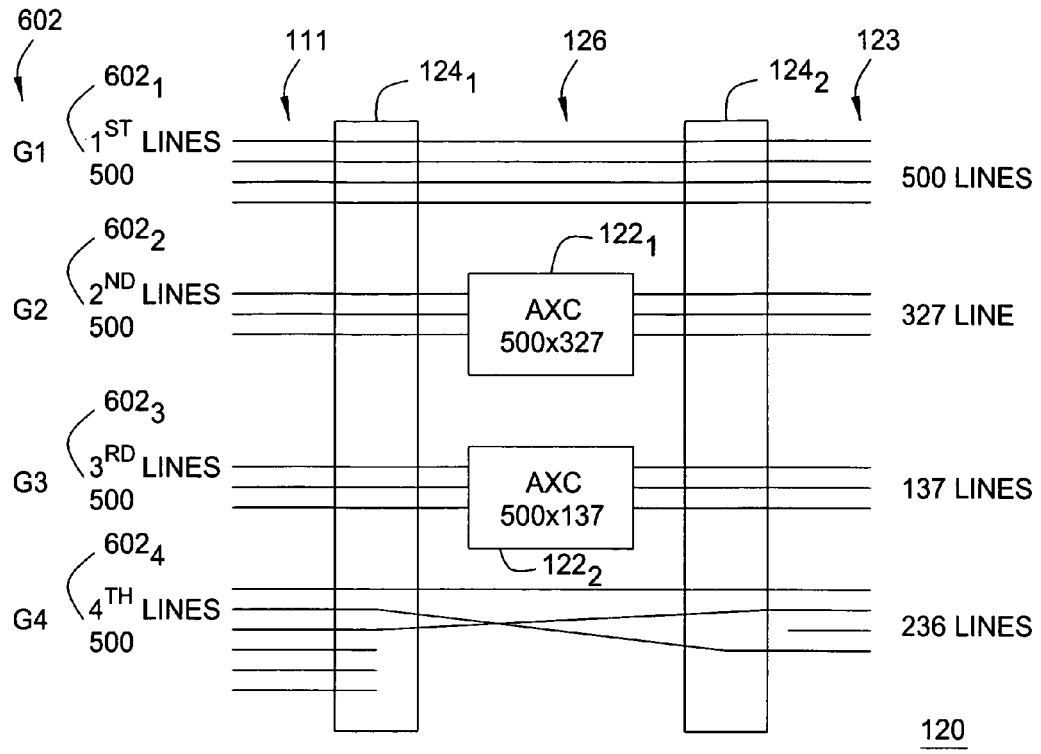
FIG. 6 is a block diagram of a logical wiring arrangement at an exemplary hub in accordance with the principles of methods of FIGS. 3 and 5A-5B.

FIGS. 5A and 5B collectively depict a flowchart of a method 500 for determining an optimal line connectivity arrangement at a hub. FIG. 6 is a block diagram of a logical wiring arrangement at an exemplary hub in accordance with the principles of methods of FIGS. 3 and 5A-5B. FIG. 6 should be viewed in conjunction with FIGS. 3 and 5A-5B.

Referring to FIG. 5A, the method 500 starts at step 501 and proceeds to step 502, where a first group $G_j$ (e.g., group G1) is selected from a plurality of groups established at step 312 of FIG. 3. Recall that the subscriber lines are classified by penetration and churn rates, and then grouped accordingly, as shown in FIG. 4. The type of connectivity to be provided between the subscriber lines to the feeder lines for each group is determined by method 500 of FIGS. 5A and 5B. Such connections between the subscriber lines 111 and feeder lines 123 include direct connections, connections through an AXC 122, or termination at the frames. In this latter case, any future connections of these terminated connections are made by dispatch.

At step 504, the penetration rate of the selected group of subscriber lines is compared to the penetration rate threshold value $P_{high}$ set in step 308 of FIG. 3. Specifically, if the penetration rate of the selected group of subscriber lines exceeds the penetration rate threshold value $P_{high}$, the method 500 proceeds to step 506. At step 506, the subscriber lines that have a high penetration rate are connected directly to the feeder lines. Referring to FIG. 4, in one embodiment the direct connectivity to the feeder lines is made regardless of churn rate (i.e., high or low). However, as discussed below in greater detail, cost benefit analysis may dictate that subscriber lines having a high penetration rate and a high churn rate should be connected via an AXC switch 122. The method 500 then proceeds to step 524. At step 524, if there are more subscriber line groups remaining, the method proceeds to step 526, where the next group of subscriber lines is selected, and method 500 is repeated. Otherwise, at step 534, the method proceeds to step 599, where method 500 ends.

Referring to FIG. 6, four exemplary groups of subscriber lines 111 are shown coupled to the first termination frame 124₁. Continuing with the above example of 500 subscriber premises supported by the hub 120, where each subscriber premise has four subscriber lines, a total of 2000 subscriber lines are coupled to the first frame 124₁. Similarly, four groups of respective feeder lines 123 are coupled to the second termination frame 124₂. It is noted that the number of feeder lines 123 may be less than the number of subscriber lines.

The first group G1 is associated with the first of the four subscriber lines to each premise 120. Therefore, the first group G1 has 500 first subscriber lines. Similarly, the second group G2 is associated with the second of the four subscriber lines to each premise 120. Therefore, the second group G2 also has 500 second subscriber lines, and so forth. As discussed with respect to steps 504 and 506, the first group G1 is illustratively shown having the 500 subscriber lines coupled directly to the feeder lines.

If at step 504, the penetration rate is not greater than the high penetration rate threshold value $P_{high}$, then the method 500 proceeds to step 508. At step 508, a determination is made whether the penetration rate is less than the low penetration rate threshold value $P_{low}$. If the penetration rate of subscriber lines is less than the low threshold rate $P_{low}$, then the method proceeds to step 510, where the subscriber lines are terminated at the remote hub 120. Referring to FIG. 6, subscriber line group G4 are terminated at the first termination frame 124₁. The subscriber lines of the fourth group G4 are connected to feeder lines as needed. The wiring is performed manually by dispatch of field personnel. The method 500 then proceeds to step 524. At step 524, a determination is made whether another subscriber line group 602 requires consideration, as discussed above.

If at step 508 it is determined that the subscriber line penetration falls somewhere equal to or between the high and low penetration threshold values $P_{high}$ and $P_{low}$, the method 500 proceeds to step 512. At step 512, a determination is made whether the churn rate of the selected group of subscriber lines is less than or equal to the churn rate threshold value $X_{ch}$ set in step 308 of method 300 (FIG. 3). If at step 512, the churn rate is less than the churn rate threshold value $X_{ch}$, then the method 500 proceeds to step 510, where the subscriber lines of this group are again terminated at the hub 120. Subscriber lines in this group are connected to feeder lines by dispatch, as required. Referring to FIG. 4, which illustrates the policies of the present invention, a subscriber line group having a medium penetration rate and a low churn rate are terminated at the hub. Referring to FIG. 6, the fourth group subscriber lines G4 may represent a portion of those subscriber lines having a medium penetration rate and a low churn rate. The method 500 then proceeds to determination step 524, where either a next group is selected at step 526 or the method ends at step 599.

If at step 512, the churn rate is greater than or equal to the churn rate threshold value $X_{ch}$, then the method 500 proceeds to step 514 of FIG. 5B. Referring to FIG. 4, the selected group of subscriber lines are candidates for connection to the feeder lines via the AXC switch 122. Referring to FIG. 6, subscriber lines of the exemplary second group G2 602₂ and third group G3 602₃ are illustratively shown connected to the feeder lines via AXC switches 122₁ and 122₂, respectively.

The main concept of steps 502 through 512 of FIG. 5A is to classify subscriber lines according to their penetration rate and churn rate. Each group may have its own wiring strategy. There are variations on the above classification policies shown in FIG. 4. For example, group 3 of FIG. 6 could be sub-divided into two groups, where one group has modest churn rate while the other group has the high churn rate. Subscriber lines in the group with high churn rate may be treated in as similar manner as subscriber lines of group 1 (i.e. connected feeder lines directly).

At step 514, the controller 162 determines the size of the AXC switch 122 for those groups of subscriber lines having a medium penetration rate and high churn rate, such as subscriber line groups 2 and 3 of FIG. 6. The size of the AXC switch 122 for each group is based on the coverage rate $C_i$.

A key concept in supporting concentration is the coverage rate. The coverage rate (for a particular value of feeder lines) is the percentage of the churn that can be handled by the AXC switch without having to initiate a dispatch. Thus, the percentage value for when a dispatch is necessary is 1 minus coverage rate (1−x %, where x≧0).

Consider the above example shown in FIG. 6. It is assumed that it is desirable to connect all 500 of the $2^{nd}$ subscriber lines 602₂ to the AXC 122₁. Accordingly, a determination must be made regarding the appropriate number of the feeder lines that should be connected to the AXC 122₁. If a large number of feeder lines are connected, a large AXC 122 is required, thereby increasing the costs of the system. On the other hand, if only a small number of feeder lines are connected to the AXC $122_1$, the number of second subscriber lines may exceed the total number of feeder line at the hub 120, such that dispatches may become necessary.

The number of the feeder lines that is necessary to support a desired coverage rate may be computed from the penetration rate. Let there be a group of N subscriber lines with the same characteristics with a penetration rate of p. Following the above example, in TABLE 1 subscriber line 2 illustratively has a penetration rate of 60%. The number of lines N in this second group is 500 subscriber lines (N=500). The number of lines that are illustratively considered active for this second group follows a binomial distribution, as shown in TABLE 2.

TABLE 2

| Parameter | General formula | Value for Example |
|---|---|---|
| Mean (m) | N*p | 300 |
| Variance ($\sigma^2$) | N*p*(1 − p) | 120 |
| Standard deviation ($\sigma$) | $((N*p*(1-p)))^{1/2}$ | 10.95 |

The binomial distribution can be approximated by the normal distribution and a table of coverage rate versus number of feeder line can be easily constructed as shown in TABLE 3. It is noted that the value identified with the asterisk (*) is a value obtained by using a conventional normal distribution table.

TABLE 3

| Number of feeder lines | | | |
|---|---|---|---|
| Value | as m & $\sigma$ | Coverage rate | Dispatch rate |
| 327 | m + 2.46*$\sigma$ | 99% | 1% |
| 329 | m + 2.64*$\sigma$ | 99.5% | 0.5% |
| 335 | m + 3.1*$\sigma$ | 99.9% | 0.1% |

Therefore, if an AXC of size 500×330 is deployed to support the second line, such switch would eliminate 99.5% of the dispatches in service provisioning. An AXC of size 500×335 would eliminate 99.9% of the dispatches. Note that for a churn rate of 10% per year, there are approximately a total of 30 dispatches. For all practical purpose, all dispatches are eliminated.

Similar exemplary values may be determined for the third line (e.g., group $602_3$ of FIG. 6), as shown in TABLE 4.

TABLE 4

| Number of feeder Lines | | | |
|---|---|---|---|
| Value | as m & $\sigma$ | Coverage rate | Dispatch rate |
| 137 | m + 2.36*$\sigma$ | 99% | 1% |
| 138 | m + 2.6*$\sigma$ | 99.5% | 0.5% |
| 141 | m + 3.1*$\sigma$ | 99.9% | 0.1% |

Continuing with the example provided above, the first subscriber line group $602_1$, which has a high penetration rate, is directly connected to feeder lines. The fourth subscriber line group $602_4$, which has as low penetration rate, is illustratively terminated at the remote hub. Additionally, both the second and third subscriber line groups $602_2$ and $602_3$ are candidates to be connected an AXC switch 122, such as AXCs 122, and $122_2$, respectively.

Assuming a coverage rate of 99%, in order to support the second line group $602_2$ in this example, an AXC of size of 500×327 is required. It is noted that in some applications, a switch may still be too big or costly to implement. Another technique to further reduce the switch size is via partitioning. That is, the selected AXC switch 122 may be further partitioned to reduce the number of cross-points needed. However, the number of feeder lines that are connected to the AXC will increase. The exemplary 500 subscriber line switch may illustratively be partitioned into smaller groups, such as four groups each having 125 lines. Method 500 described above is then applied to each partition as if it were an independent switch.

To maintain the dispatch at a desirable rate of 1%, each partition should have a dispatch rate of 0.25% or a coverage rate of 99.75%. Accordingly, 91 feeder lines should be utilized for each partition. This results in four AXC switches, each of the size 125×91. Using the full matrix implementation as a reference, the number of cross points are 500*327=163.5K for the non-partitioned case, as compared to 4*125*91=500*91=45.9 K cross-points for the partitioned case, which is approximately one-third of the original size.

Figure 7:
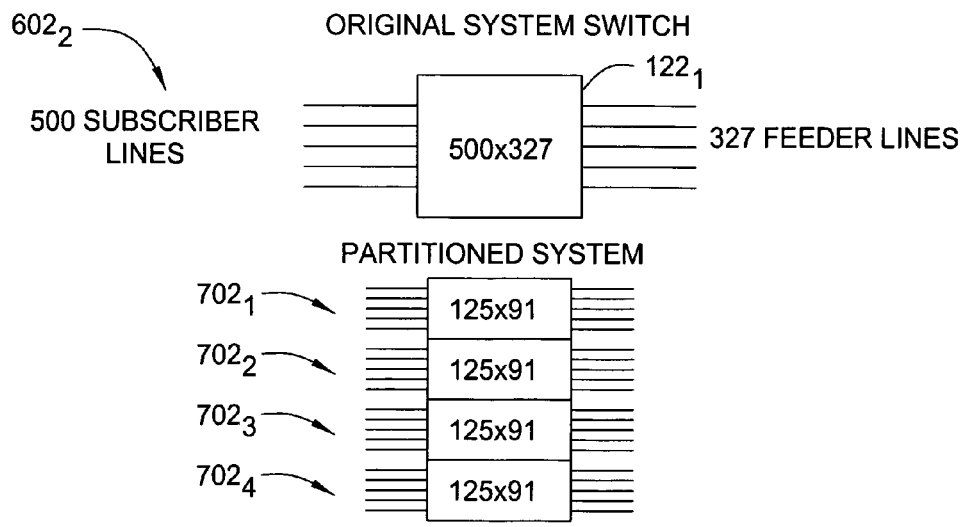
FIG. 7 depicts a partitioned AXC switch in accordance with the principles of the present invention.

FIG. 7 depicts a partitioned AXC switch 122 in accordance with the principles of the present invention. In particular, the AXC switch $122_1$ illustratively shown in FIG. 6 having a size of 500×327 is partitioned into four partitions $702_1$ through $702_4$, where each partition has a size of 125×91 subscriber lines to feeder lines. It is noted that the 91 feeder are computed based on the fact that there are four partitions. Specifically, for the total to have a dispatch rate of 1%, each partition needs to have a dispatch rate of 0.25%. As a result, each partition needs to have a coverage rate of 99.75%, instead of the usual 99.0%. For 99.75%, one needs about 2.72 times sigma ($\sigma$), the standard deviation, which is then used to compute the number of feeder lines in a similar manner discussed above.

Accordingly, there are considerable savings in terms of number of cross-points. However, the AXC must be designed with partitioning in mind so that the cost reduction can be realized. Furthermore, with four partitions the number of feeder lines goes up from 327 to 364, which may not be acceptable in situation where the feeder lines are severely limited. Moreover, management of a partitioned network may be slightly more complicated. Therefore, there are considerable trade-offs whether partitioning is beneficial or not. However, a conventional business case type analysis on the net present value or the break-even period may be used in deciding whether to partition a switch. It is noted that in one embodiment, the controller 162 includes at least one business case analysis module in its logic to perform such cost/benefit analyses.

Referring to FIG. 5B, once the size of the AXC for each coverage rate is determined at step 514, the method 500 proceeds to step 516. Cost/benefit analyses are used to determine whether AXCs 122 should be deployed for a group of subscriber lines at the hub. At step 516, the cost/benefit analysis is determined for each coverage rate $C_i$. Specifically, many factors such as financial expenditures, the operational expense in sending a dispatch, among other financial and operational considerations contribute in the determination of the optimal hub configuration.

At step 518, a cost/benefit analysis is determined for the case where the subscriber lines are not connected to an AXC, but instead are terminated at the remote hub. Recall that these terminated lines are connected to the feeder lines by dispatch on an as need basis. At step 520, the cost/benefit analyses of steps 516 and 518 are compared, and the analysis with the best financial return is selected. At step 522, the subscriber lines are either connected to the AXC switch 122 or terminated at the remote hub 120.

Referring to FIG. 6, in the example presented herein, the economics illustratively provide that both the second and third groups of subscriber lines $602_2$ and $602_3$ are terminated an AXC 122. Assuming a coverage rate of 99%, the AXC for the second lines $602_2$ illustratively has a size of 500×327. Further, the AXC for the third lines $602_3$ illustratively has a size of 500×137. It is noted that the configuration of FIG. 6 is shown and discussed for illustrative purposes only, and one skilled in the art will appreciate that the economic analyses may provide other hub configurations. For example, the economic analyses may show that only the second lines (second group G2) $602_2$ should be connected at the AXC $122_1$, while the third lines $602_3$ should be terminated at the remote hub. It is further noted that other configurations are also possible (e.g., both second and third subscriber line groups $602_2$ and $602_3$ are terminated at the remote hub).

At step 524, a determination is made whether there are other subscriber line groups that have not been selected. If so, the method 500 proceeds to step 526, where the next group is selected, and method 500 is repeated for that selected group. Otherwise, if all the groups have been selected under method 500, the method 500 proceeds to step 599, where method 500 ends.

Thus, the present invention specifies the size of the switch, as well as how it is being connected. The cross-connects may be implemented in a number of ways, such as full matrix, strictly non-blocking Clos, rearrangeable Clos, among other switch configurations. At the end of the process (i.e., method 500), each group is either directly connected to feeder lines, connected to an AXC (with the size of AXC determined), or terminated at the remote hub.

The method 500 constitutes the main part of an algorithm for selecting the best AXC configuration for a given hub. Further, an error checking procedure may also be performed to ensure that feeder lines are not overused.

Feeder lines that are connected to subscriber lines directly or to an AXC are committed to support particular groups 602. Such feeder lines are referred to as "committed" feeder lines. If the sum of all the committed feeder lines is more than the total number of the feeder lines, then some of the committed lines need to be released (i.e., freed up).

One option is to provide error checking by selecting a group with the lowest penetration rate from among the plurality of groups of lines that are connected to feeder lines directly. These lines of the selected group are connected to an AXC instead. The size of the AXC can be determined using steps 514-520 of method 500. Logically, this is equivalent to resetting the upper threshold $P_{high}$ to a higher value. By doing so, the number of committed lines is reduced.

Figure 11:
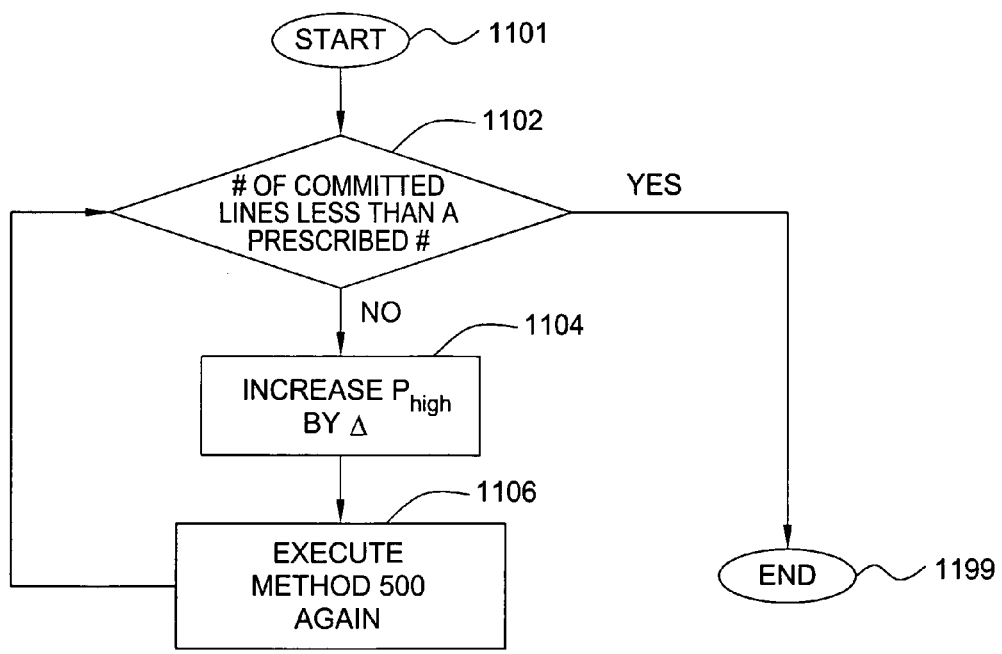
FIG. 11 is a flow diagram of a first method of providing error checking.

FIG. 11 is a flow diagram of a first method 1100 of providing error checking. The method 1100 starts at step 1101 and proceeds to step 1102, where a determination is made whether the number of committed lines is less than a prescribed number (threshold) of feeder lines. The default of the threshold is equal to the total number of feeder lines 123 at the hub 120, although the threshold value may be set to a lesser value.

If at step 1102, the controller 162 determines that the number of committed lines is less than the threshold number, the method 1100 ends at step 1199, since there are no errors. Otherwise, the method 1100 proceeds to step 1104. At step 1104, the controller increases the threshold $P_{high}$ to the larger value by a value $\Delta$. By increase this value, committed subscriber lines and feeder lines are connected to AXC instead.

The method then proceeds to step 1106, where method 500 is performed again to determine the number of committed lines. Once method 500 is performed, the method 1100 is run again until at step 1102, the number of committed lines is less than the threshold number of lines, and method 1100 ends at step 1199. It is noted that the value of $\Delta$ can be refined by running the process iteratively. For example, if estimates that the $P_{high}$ should be between x and x+$\Delta$, one can try x+$\Delta$/2 in the next iteration.

From a configuration view-point, there are three types of subscriber lines. Subscriber lines that are permanently connected to feeder lines (these are the committed lines); subscriber lines that are connected to the AXC; and subscriber lines that are manually connected to feeder lines on an as-needed basis (referred to as "manually connected" subscriber lines).

The controller can also check whether there are enough manually connected feeder lines to support the manually connected subscriber lines. The number of required manual connected feeder lines can be computed before using the normal distribution. To determine the connectivity of the manually connected subscriber lines, the average service penetration rate of all the manually connected subscribed lines, as well as the number of manually connected subscriber lines, is required input to the controller. If there is not a sufficient quantity of manually connected feeder lines, this value can be increased by increasing the value of $P_{low}$. By increasing $P_{low}$, both subscriber lines and feeder lines that are connected to the AXC are released to the manually connected pool, but at rate that accommodates more manual connections.

Figure 12:
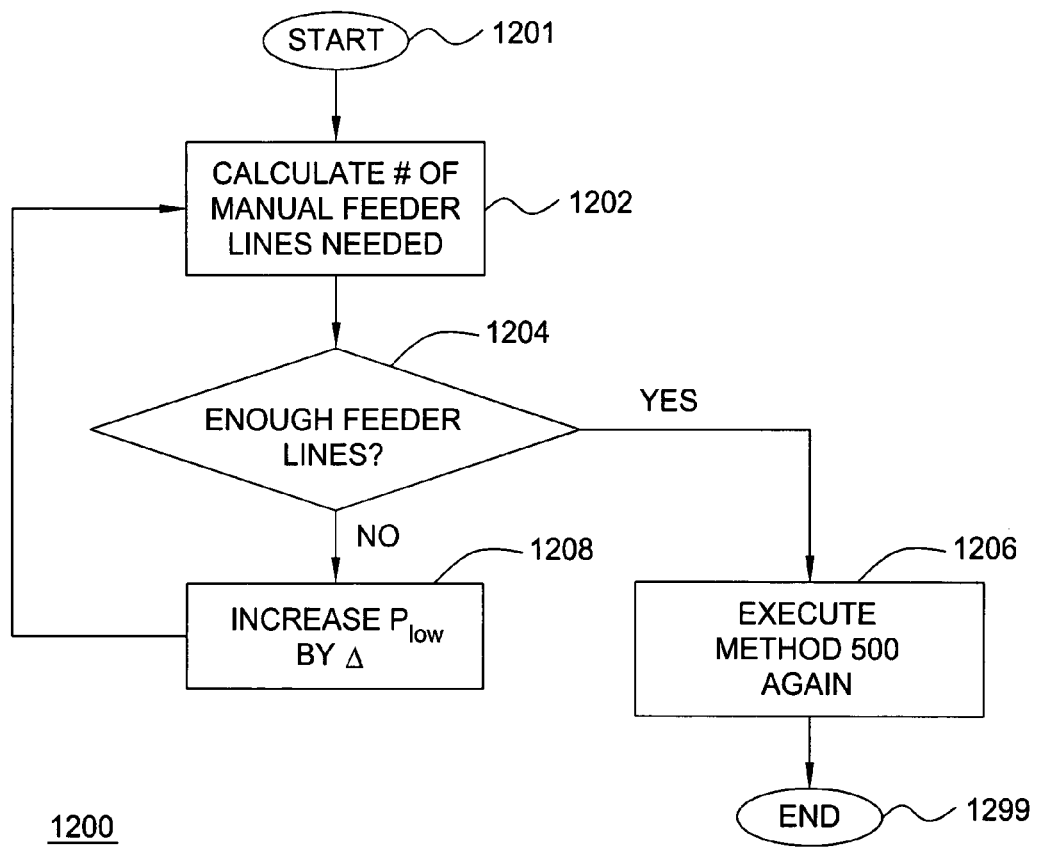
FIG. 12 is a flow diagram of a second method of providing error checking.

FIG. 12 is a flow diagram of a second method 1200 of providing error checking. The method 1200 starts at step 1201 and proceeds to step 1202, where the number of manually connected feeder lines required is determined. At step 1206, if there are not enough feeder lines, the method proceeds to step 1208, where the threshold value of $P_{low}$ is increased. The method 1200 then returns to step 1202, until at step 1204, a determination is made that there are enough feeder lines.

Once there is a determination that there are enough feeder lines, the method 500 proceeds to step 1206. At step 1206, method 500 is executed again if the value of $P_{low}$ was changed. Thereafter, method 1200 proceeds to step 1299, where the method 1200 ends.

In an alternative embodiment of the error checking procedure, the product of the penetration rate times the churn rate (penetration rate×churn rate) may be used as the selection criterion instead of just the penetration rate. It is noted that under normal circumstances, these two error checking procedures (1100 and 1200) are not needed unless the two thresholds $P_{high}$ and $P_{low}$ are set up incorrectly. Accordingly, these methods may be used to reset the threshold to more realistic values.

The present invention has so far been discussed in terms of configuring a hub when POTS services are being provided by the service provider. The present invention is also applicable for when DSL services are available to the subscriber premises. It is noted that while POTS service typically has a low churn rate, the DSL service typically has a high churn rate. In particular, the DSL service has a modest penetration rate, but a high churn rate of approximately 20% per year. Therefore, the AXC switch, in conjunction with the present invention, is useful to help reduce the number of dispatches of the DSL service.

Continuing with the example above, in addition to the previous assumption of 500 homes served, 4 subscriber lines per home, and 1200 feeder lines, additional assumptions are necessary when the DSL service is provided. A first assumption is there is a maximum of one DSL subscriber per household (i.e., subscriber premise). This is a reasonable assumption since the DSL modem 108 at the subscriber premise is ultimately connected to a router 134. Specifically, all of the customer's terminal equipment is connected to this router, and thus the DSL service, through a local area network.

A second assumption is that the penetration rate for DSL is 50% per household. This assumption is based on marketing projections that expect 50% of the households to utilize some form of DSL service.

A third assumption is that a DSLAM 130 is deployed at the remote hub 120. Deploying the DSLAM 130 at the remote hub 120 reduces the distance between the DSLAM 130 and the customer premise 102. By shortening the distance between these two points (DSLAM and subscriber premises) the DSL service can operate at near maximum speed, which enables the service provider to offer more services (such as video).

Another assumption is that the line sharing option for DSL is supported. Specifically, a service provider can provide both voice (POTS) and digital (DSL) services over a single subscriber line.

Figure 8:
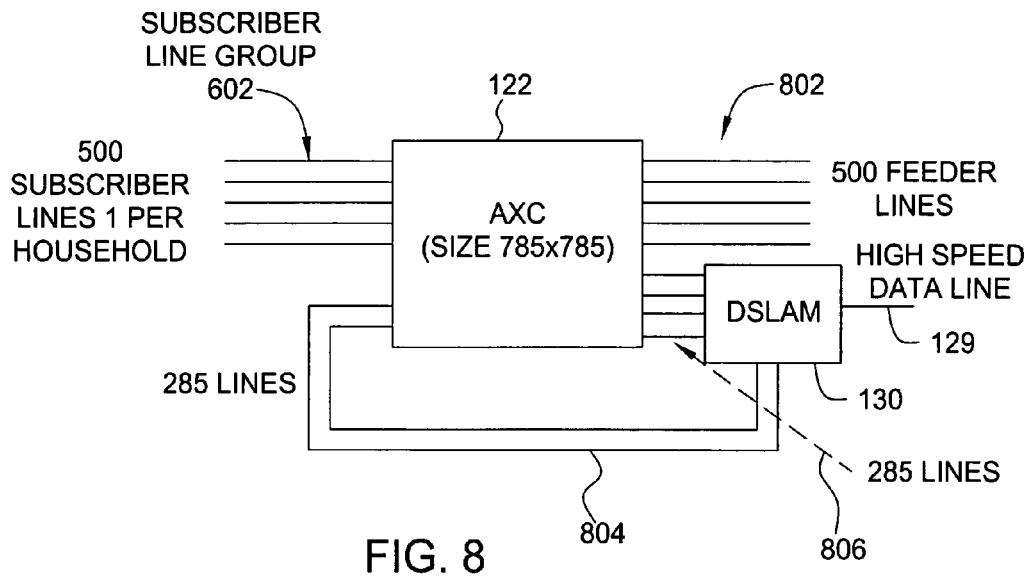
FIG. 8 is a block diagram of an exemplary switch suitable for providing DSL service with a line sharing option.

FIG. 8 is a block diagram of an exemplary switch suitable for providing DSL service with a line sharing option. The exemplary switch 122 is depicted as coupling a group of subscriber lines 602 to a first plurality of feeder lines 802. Further, a DSLAM 130 is coupled to a second plurality of feeder lines 806. The DSLAM 130 comprises a high speed data line 129 that may be coupled to a router or switch (not shown), and a plurality of feedback lines 804 that are fed back as input lines to the AXC 122.

Specifically, as each household only has at most one DSL line, only one subscriber line from each household (line group 602) needs to be connected to the AXC 122. If a customer subscribes only to POTS services for this subscriber line, the subscriber line (in line group 602) is cross-connected to one of the feeder lines in feeder line group 802. If the subscriber line is used for DSL service with or without POTS service, the subscriber is cross-connected to a line in group 806. The lines in group 806 are connected to the DSLAM 130. If POTS service is not subscribed, the DSL signal will be terminated at the DSLAM 130. If the line sharing option is used for that particular line (i.e. POTS service is also provided on that line), the splitter 140 (FIG. 1) at the DSLAM 130 will split the POTS signal from the multiplexed signal sent from the subscriber premises 102, and forward the POTS signal back to AXC 122 using line group 804. The AXC 122 then cross connects the line (in group 804) to a feeder line in group 802.

As discussed above with respect to step 514 of method 500 for POTS services, the size of the various line groups are first determined. The exemplary group 602 includes 500 lines, one line per household. The first step is to determine the number of DSL ports needed for a given DSL-coverage rate. The technique described in method 500 above regarding coverage rates for the POTS service is applied for DSL service as well. For a 50% penetration rate, the average (m) for 500 households is 250. The standard deviation ($\sigma$) is approximately 11.2 (i.e. $\sqrt{(500)(0.5)(0.5)} \approx 11.2$). For a DSL-coverage rate of 99.9%, the number of DSL ports is approximately equal to 285 (i.e., $(m+3.1\sigma) \approx 285$ DSL ports, where m=250). Thus, 285 feeder lines are required from AXC 122 to the DSLAM 130.

Thereafter, a determination is made for the number of feeder lines at group 802 that should be connected to the AXC 122. Group 802 represents connectivity for POTS service. To compute the number of feeder lines at group 802, the penetration rate for regular POTS for the subscriber line in group 602 is required. Assuming that this is the first line having a high penetration rate (e.g., group 602₁), then the optimal number of feeder lines in group 802 equals to the number of subscriber lines, which is 500 feeder lines in this example.

The size of line group 804 depends on the penetration rate of the line sharing option among DSL subscribers. The simplest design is to assume that this rate is 100%. In this case, then, line group 804 is the same size as line group 806, namely 285 lines. This configuration is referred to as the canonical configuration (i.e., normalized configuration), as it will work in all conditions (e.g., changing line group 602₁ to the second line group 602₂, lowering the line sharing option penetration rate, among other configurations). That is, the size of line group 804 is the same as line group 806, as opposed to a non-canonical configuration, where line group 804 does not equal line group 806.

Therefore, for the canonical configuration, the number of upstream ports at the AXC 122 is 500+285=785 ports. Similarly, the number of downstream ports is also 785 ports. The system size of the AXC is then 785×785. The final step is to perform a cost/benefit analysis (i.e., steps 516 and 518 of method 500) to verify whether the deployment of the AXC is economically justifiable.

If the DSL service does not support the line sharing option, then the line group 804 is not necessary, and the AXC has a reduced size of 500×785. This configuration represents the most pessimistic conditions, and the configuration will work for other scenarios (e.g., second line group 602₂, third line group 602₃, and so forth).

It is noted that it is not necessary to have the same number of feeder lines that are connected to the AXC equal to the number of subscriber lines connected. However, in order to do so, the service provider first needs to determine the characteristics of line group 602 (i.e. first line group 602₁ or second line group 602₂). The SP will also need to determine the penetration rate of POTS, DSL, and the line sharing option. In the example provided herein, the penetration rate for second line POTS and DSL is 60% and 50%, respectively.

Assume that of all the DSL subscribers, 80% of them will use the line sharing option. Accordingly, 40% (50%×80%) of the line supports both the POTS and DSL service (i.e., line sharing option is used). Further 20% (60% less the 40% that subscribe to both services) of the lines would support only POTS service, and 10% (50%−40%) of the lines support DSL service only. The remaining 30% (100%−40%−20%−10%) of the subscriber premises 102 do not subscribe to either POTS or DSL services. That is, 30% of the lines are not active (i.e. neither services is subscribed).

Carrying the example one step further, if the coverage rate is 99.5%, the size of the line groups 804 and 806 are respectively 327 and 285 lines each, which can be computed in a similar manner as described above. Further, the size of line group 804 is 230 lines for this 99.5% coverage rate. Accordingly the size of the AXC 122 is 730×623, which offers a slight reduction in the size (compared to 785×785). Thus, the cost benefits must be weighed to implement a coverage rate of 99.5% as compared to a 99% coverage rate.

It is noted that a SP may also offer voice over IP (VoIP) service over DSL. It is likely that when a DSL subscriber uses the VoIP service instead of DSL service over the second line, the penetration rate for line sharing option will be much lower, and a reduction in the AXC switch size would be more pronounced.

The technique of partitioning is also applicable for DSL services. However, partitioning also increases the number of the DSLAM ports required. Typically, the size of DSALM 130 is severely limited at the remote hubs 120 because of hub space constraints. Accordingly, partitioning may not always be practical in many instances. Again, the present invention specifies the size of the cross-connect module, as well as how it should be connected. Further, the cross-connect modules can be implemented in a number of the ways (3-stage Clos SNB, 3-stage Clos AR, etc.) and the method chosen is independent of this invention.

Figure 9:
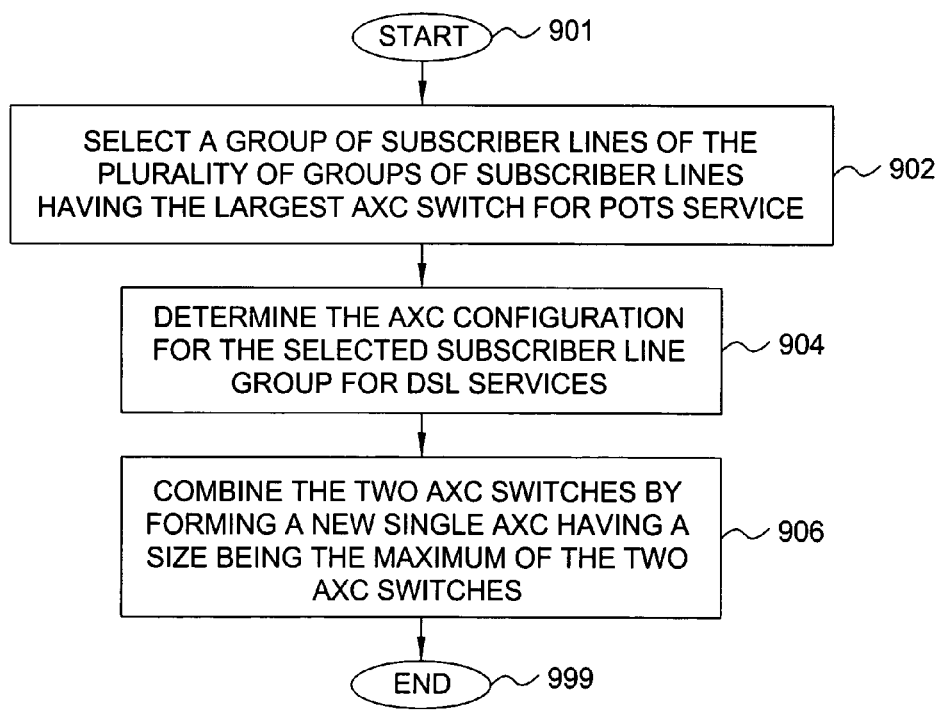
FIG. 9 is a flow diagram of a method for providing cross-connections at a hub for supporting POTS and DSL services.

FIG. 9 is a flow diagram of a method 900 for providing cross-connections at a hub for supporting POTS and DSL services. Specifically, the present invention allows a service provider to integrate the solutions for the POTS and DSL services, such that a hub 130 can optimally provide connectivity for subscriber lines providing such services.

The method 900 starts at step 901, and proceeds to step 902, where from among, the four subscriber line groups ($1^{st}$ line, $2^{nd}$ line, and so forth), the group that has the largest AXC for the POTS service is selected. It is noted that there may be no group eligible for selection. Further, it is noted that legal requirements or the service provider's business policy may require that the first subscriber line group be selected (i.e., the default line is the $1^{st}$ line).

At step 904, the controller 162 determines the AXC switch configuration for the line group selected at step 902. In this instance, method 500 of FIGS. 5A-5B is utilized. At step 906, the AXC switch for POTS services and the AXC switch for DSL services are combined. The size of the resulting AXC switch is the maximum of the two AXC switches (i.e., DSL and POTS switches).

Figure 10:
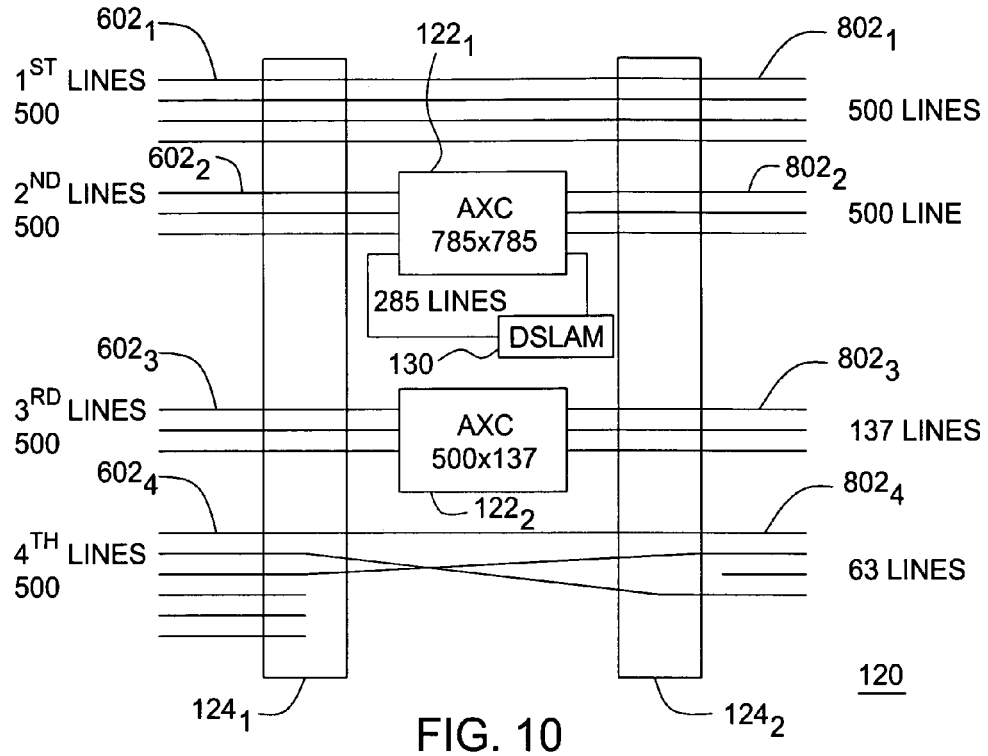
FIG. 10 is a block diagram of a logical wiring arrangement integrating POTS and DSL services at an exemplary hub, in accordance with the principles of the present invention.

FIG. 10 is a block diagram of a logical wiring arrangement integrating POTS and DSL services at an exemplary hub, in accordance with the principles of the present invention. That is, the integrated solution is illustrated in FIG. 10. FIG. 10 is identical to FIG. 6, except that the 500×327 AXC $122_1$ for the second line in FIG. 6 is replaced with a 785×785 sized AXC switch configuration shown in FIG. 8.

Specifically, the exemplary 500 first subscriber lines of group 1 $602_1$ are directly coupled to 500 feeder lines. The exemplary 500 second subscriber lines of group 2 $602_2$ are coupled to AXC switch $122_1$ having a size of 785×785, meaning the switch accommodates 500 second subscriber lines being coupled to 500 feeder lines, plus 285 DSL lines being fed back from the output ports of the DSLAM 130 to the input ports of the switch $122_1$. The exemplary 500 third subscriber lines of group 3 $602_3$ are coupled to AXC switch $122_2$ having a size of 500×137, meaning the 500 second subscriber lines are coupled to 137 feeder lines. Finally, the exemplary 500 fourth subscriber lines of group 4 $602_4$ are terminated at the hub 120, and are coupled to feeder lines by dispatch, as needed. Thus, the present invention enables a service provider to optimize the wiring connectivity at a remote hub to provide at least one of POTS and DSL services to a plurality of subscriber premises.

The present invention is based on the characteristics of the subscriber lines, and provides a method and apparatus to optimize the subscriber line connectivity at a hub. The solutions derived during the optimization process take into account the penetration rates and churn rates of the subscriber lines in a home (subscriber premise). The subscriber lines are grouped based on such penetration and churn rates, and an optimization method of the present invention determines for each group of subscriber lines, the most beneficial technique to provide connectivity to the feeder lines. The solutions include direct coupling to the feeder lines, implementing an AXC switch between the subscriber lines and feeder lines associated with the particular group, or terminating the subscriber lines at the hub, which can be connected at a future time by dispatch of field personnel.

In an instance where an AXC switch 122 is used to provide connectivity, the present invention is used to determine the optimal size of the switch, meaning the number subscriber lines and feeder lines are required to provide connectivity for such group. It is noted that the number of feeder lines may be equal to or less than the number of subscriber lines for a particular group of subscriber lines.

In one embodiment, the present invention may be implemented as a software tool, illustratively installed at a control office. The present invention may also be used by service providers to determine the optimal configuration of the AXC switch 122 on a hub-by-hub basis. The present invention applies to POTS service, the DSL service (with or without line-sharing), and an integrated solution.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof.

What is claimed is:

1. A method for configuring connectivity at a hub having a plurality of subscriber lines and a plurality of feeder lines, comprising the steps of:
    identifying all services offered at said hub;
    categorizing said plurality of subscriber lines into groups based on penetration rates and churn rates; and
    connecting each group of subscriber lines to corresponding feeder lines selected according to group category.

2. The method of claim 1, wherein for each service offered at said hub, said categorizing comprises the steps of:
    determining a quantity of subscriber premises served by said hub;
    determining a quantity of subscriber lines per subscriber premise; and
    computing a quantity of subscriber lines forming said plurality of subscriber lines.

3. The method of claim 2, wherein said connecting comprises the step of:
    permanently connecting to feeder lines on a line-to-line basis those subscriber lines of a group having a penetration rate exceeding a high penetration rate threshold.

4. The method of claim 3, wherein said connecting each group of subscriber lines to feeder lines comprises the steps of:
    determining whether a quantity of feeder lines committed to subscriber lines at said hub exceeds a predetermined committed feeder line threshold value; and
    increasing said high penetration threshold in an instance where said quantity of feeder lines exceeds said predetermined committed feeder line threshold value.

5. The method of claim 2, wherein said connecting comprises the step of:
    terminating at said hub those subscriber line groups having a penetration rate below a low penetration threshold.

6. The method of claim 5, further comprising the step of:
    connecting said subscriber lines to feeder lines through dispatch on an as-needed basis.

7. The method of claim 5, wherein said connecting each group of subscriber lines to feeder lines comprises the steps of:
- determining a quantity of manual feeder lines required at said hub;
- determining whether said quantity of manual feeder lines is capable of supporting a quantity of manually connected subscriber lines; and
- increasing said low penetration rate threshold in an instance where there is not enough manual feeder lines.

8. The method of claim 2, wherein said connecting comprises the step of:
- connecting to feeder lines via a switch those subscriber line groups having a penetration rate between a low penetration rate threshold and a high penetration rate threshold, and a churn rate exceeding a churn rate threshold.

9. The method of claim 8, further comprising the step of:
- determining a size of said switch for said selected subscriber line group.

10. The method of claim 9, wherein said determining a size of said switch comprises the step of:
- determining a quantity of feeder lines for coupling to said switch.

11. The method of claim 10, wherein said determining a quantity of feeder lines comprises the step of:
- determining a plurality of dispatch rates for said feeder lines, each a dispatch rate being indicative of a percentage of subscriber lines for connecting to said feeder lines by dispatch.

12. The method of claim 8, wherein said connecting to feeder lines via a switch comprises the step of:
- deploying said switch in and instance where a cost benefit analysis is favorable over not deploying said switch.

13. The method of claim 12 further comprising the step of:
- terminating said group of subscriber lines for instances where a cost benefit analysis is favorable over not deploying said switch.

14. The method of claim 12, wherein said identifying all the services offered at the hub comprises the steps of:
- determining whether a subscriber line provides plain old telephone system (POTS) services to a subscriber premise;
- determining whether a subscriber line provides digital subscriber line (DSL) services to a subscriber premise; and
- determining whether a subscriber line provides same line access of POTS and DSL services to a subscriber premise.

15. The method of claim 14, further comprising the step of:
- connecting a group of subscriber lines providing DSL services to a digital subscriber line access multiplexer (DSLAM) connected between said plurality of subscriber lines and feeder lines.

16. The method of claim 15, wherein said connecting a group of subscriber lines providing DSL services comprises the step of:
- connecting said group of subscriber lines providing DSL services to said DSLAM via said switch.

17. The method of claim 2, wherein said connecting comprises the step of:
- terminating at said hub, those subscriber line groups having a penetration rate between a low penetration rate threshold and a high penetration rate threshold, and a churn rate below a churn rate threshold.

18. The method of claim 17, further comprising the step of:
- connecting said subscriber lines to feeder lines through dispatch on an as-needed basis.

19. The method of claim 2, wherein said connecting each group of subscriber lines to feeder lines comprises the steps of:
- permanently connecting a first group of subscriber lines to a first group of feeder lines in an instance a penetration rate of said first group exceeds a first predetermined penetration rate;
- manually connecting a second group of subscriber lines to a second group of feeder lines in an instance a penetration rate of said second group is below a second predetermined penetration rate; and
- connecting a third group of subscriber lines to a third group of feeder lines via at least one switch, in an instance a penetration rate of said third group is between said first and second predetermined penetration rates and a churn rate of said third group exceeds a predetermined churn rate.

20. Apparatus for configuring connectivity at a hub having a plurality of subscriber lines and a plurality of feeder lines, comprising the steps of:
- means for identifying all services offered at said hub;
- means for categorizing said plurality of subscriber lines into groups based on penetration rates and churn rates; and
- means for connecting each group of subscriber lines to corresponding feeder lines selected according to group category.

21. The apparatus of claim 20, wherein said mean for categorizing and said means for connecting said subscriber lines to said feeder lines comprises at least one computer executable program.

* * * * *